United States Patent
Hauck et al.

(10) Patent No.: US 6,500,494 B2
(45) Date of Patent: Dec. 31, 2002

(54) SPRAY COATING MATTING METHOD FOR PRINTING PLATE PRECURSORS

(75) Inventors: Gerhard Hauck, Badenhausen (DE); Nils Nessler, Osterode (DE); Heinfried Rudolph, Hattorf (DE)

(73) Assignee: Kodak Polychrome Graphics LLC, Norwalk, CT (US)

( * ) Notice: Subject to any disclaimer, the term of this patent is extended or adjusted under 35 U.S.C. 154(b) by 0 days.

(21) Appl. No.: 09/751,184

(22) Filed: Dec. 29, 2000

(65) Prior Publication Data

US 2002/0086116 A1 Jul. 4, 2002

(51) Int. Cl.⁷ .................................................. B05D 1/04
(52) U.S. Cl. ........................ 427/480; 427/482; 427/484; 427/485
(58) Field of Search ................................. 427/479, 480, 427/482, 484, 485; 430/300, 327; 428/195, 327; 101/454, 457

(56) References Cited

U.S. PATENT DOCUMENTS

| | | | |
|---|---|---|---|
| 4,626,484 A | | 12/1986 | Nishioka et al. ............. 430/273 |
| 4,781,941 A | * | 11/1988 | Inukai et al. |
| 5,576,137 A | | 11/1996 | Frass et al. .................. 430/166 |
| 5,753,404 A | | 5/1998 | Elsaesser et al. ............ 430/162 |
| 5,948,595 A | * | 9/1999 | Watanabe |
| 5,972,561 A | * | 10/1999 | Sato et al. |
| 6,003,784 A | | 12/1999 | van der Steur ........ 239/222.11 |
| 6,003,785 A | | 12/1999 | Duey ......................... 239/223 |

FOREIGN PATENT DOCUMENTS

| | | |
|---|---|---|
| DE | 2928396 | 1/1980 |
| DE | 4335425 | 4/1995 |
| EP | 0092794 | 11/1983 |
| EP | 0344985 | 12/1989 |
| EP | 0429234 | 5/1991 |
| EP | 0545458 | 6/1993 |
| EP | 0545958 | 6/1993 |
| EP | 0848297 | 6/1998 |
| GB | 2081919 | 2/1982 |

* cited by examiner

Primary Examiner—Fred J. Parker
(74) Attorney, Agent, or Firm—Baker Botts L.L.P.

(57) ABSTRACT

A method for applying a matting layer to a radiation-sensitive layer of a printing plate precursor is disclosed. The method comprises: (a) providing a matting composition comprising a polymer and a solvent, wherein the matting composition has a solid content of more than 10% and no more than 50% by weight based on the total composition; and (b) spraying the matting composition on the radiation-sensitive layer using an electrostatically aided rotary atomizer having a bell speed of more than 10,000 rpm, wherein the distance between the bell and the radiation-sensitive layer to be coated is less than 30 cm. The printing plate precursor may be in the form of a moving web. The method of the present invention can be used for matting any kind of radiation-sensitive layer of conventional positive and negative working lithographic printing plate precursors.

9 Claims, No Drawings

SPRAY COATING MATTING METHOD FOR PRINTING PLATE PRECURSORS

BACKGROUND OF THE INVENTION

1. Field of the Invention

The present invention relates to a method for matting the radiation-sensitive layer of a printing plate precursor. In particular, this invention relates to a method for spray coating a matting layer on the radiation-sensitive layer of a printing plate precursor wherein the method excludes the necessity of a dampening step, drying step or both after the spray coating.

2. Background Information

Lithographic printing plates are prepared from plate precursors by imagewise exposing the precursor to radiation such as UV light and a subsequent developing step. Conventionally, the imagewise exposure is done in a vacuum frame; under a glass plate a mask is put on top of the precursor and the exposure is done through the mask. The vacuum removes the air and allows a close contact between the mask and plate precursor. In the case of a positive working printing plate precursor, the radiation-sensitive layer comprises a quinonediazid compound which releases nitrogen during exposure; the nitrogen is also removed by the vacuum.

When the surface of the printing plate precursor is too smooth gas can remain between the mask and precursor thus preventing close contact and causing undercutting, i.e. fine elements get lost or shifted in the tonal value after exposure and development. It is therefore preferred that the surface of the light-sensitive layer is roughened. This can, for instance, be done through dusting the surface before exposure to radiation. However, such a procedure usually results in irregularly roughened surfaces so that irregular copy results are obtained. The producers of radiation-sensitive elements such as printing plate precursors therefore make efforts to develop products which already have a rough surface. There are several methods for putting small protrusions on the surface of the printing plate to prevent the inclusion of air. This treatment of the precursor is called matting. Matting can be done by either incorporating particles into the radiation-sensitive coating solution or by using an additional treatment step after applying the radiation-sensitive coating and drying it. The first method is lacking mainly because fine filters cannot be used on the radiation-sensitive coating solution because these would remove the particles out of the coating solution. Therefore, an additional step after the coating step (i.e. radiation-sensitive coating) is advantageous. Another advantage is that the particles are insoluble in the developer and can cause sludging whereas the post-treatment can use polymers which are easily soluble in the developer.

The matting may, for instance, be done by a powder application as described in DE-A-29 28 396. The drawback of this method is that the powder must be a polymer which has to be melted by an oven process for adhesion, which restricts the choice of polymer because of the required low Tg. These polymers are usually not developer soluble.

The preferred matting method is one which is described for instance in U.S. Pat. Nos. 4,626,484 and 4,781,941. This method comprises the steps of spraying an aqueous solution of polymer by use of an electrostatically supported high speed bell followed by dampening and then drying.

Furthermore, EP-A-545458 describes a spraying method without mentioning dampening and drying. Spraying is done on a web which moves slowly, i.e. at a line speed of up to 10 m/min in order to obtain a dry matting layer. The abundance of time by the low line speed might allow air drying without an oven. However, modern line web speeds are at least four times as fast and the required length for an oven grows with the speed. For aqueous solutions infrared dryers are used frequently.

DE-A-43 35 425 describes a printing plate precursor which is matted by spraying-on a dispersion of a resin; subsequently, the plate requires infrared-drying or convection air drying.

The necessity of dampening and/or drying, of course, is not economical due to the need for additional equipment and the prolonged time for producing the precursor.

Besides the additional need of energy for a drying oven the saving of line space—i.e., no dampening nor drying section—is an important factor: the compactness provides room for additional and/or improved other process steps. In addition to these advantages in production the plate quality and the yield can be improved as well. For instance the cosmetic appearance is free from vapor pattern and there are no droplets of dripping water, a problem which is associated with the vaporization process, especially during machine start-up. The heat of an oven step can cause an additional strain to the coating, especially in case of negative working plates.

Therefore, it is the object of the present invention to provide a single step process for matting a printing plate precursor by spraying a matting layer on the radiation-sensitive layer of the precursor without the need for post-dampening, post-drying, or both. In addition, the process should be applicable to high web speed production lines.

SUMMARY OF THE INVENTION

The above object is achieved by a process in which a matting composition having a solid content of more than 10% by weight and no more than 50% by weight is spray-coated on the radiation-sensitive layer of a printing plate precursor using an electrostatically aided rotary atomizer with a bell having a distance of less than 50 cm from the radiation-sensitive layer of the printing plate precursor to be coated and a bell speed of more than 10,000 rpm.

DETAILED DESCRIPTION OF THE INVENTION

The process of the present invention can be used for matting any kind of radiation-sensitive layer of conventional positive and negative working lithographic printing plate precursors. The term "conventional plate precursor" refers to precursors which are imaged by exposing through a mask. Digitally imageable plate precursors (for instance thermo plates) are directly imaged by means of a laser without the use of a mask and therefore do not need a matting layer. In the case of positive working plate precursors, scattered light is often used for exposure and therefore especially positive plate precursors need a matting layer. Printing plate precursors which can be matted by the process of the present invention are for instance described in EP-A-0 544 264, GB-A-2081919 and U.S. Pat. No. 5,948,595 which are all incorporated herein by reference. However, the presently claimed process is not limited to these printing plate precursors.

As the matting composition to be sprayed on the radiation-sensitive layer of a printing plate precursor any known matting composition can be used as long as the solid content of the composition is adjusted to more than 10% by weight and less than 50% by weight based on the total composition. Hereafter the term "solid content" refers to the amount of polymer or polymers in the composition. The composition comprises at least one polymer (or copolymer) and at least one solvent. The composition has to meet the following requirements: (1) the polymer has to be soluble in the solvent; (2) the polymer has to be soluble in the alkaline developer which will be used for developing the imagewise-exposed printing plate precursor later; (3) the polymer should not have a negative effect on the print-out; (4) the composition should dry in air; (5) the matting layer obtained should be hard but not brittle; (6) the matting layer obtained should not be sticky at high humidity; and (7) the matting layer obtained should not adhere to the radiation-sensitive layer to such a degree that rolling up of the web causes tearing out of the radiation-sensitive layer.

Suitable solvents are water, lower aliphatic alcohols, aqueous ammonia and mixtures thereof. The use of lower alcohols improves the drying properties; however lower alcohols are not preferred due to their inflammability. The most preferred solvent is water.

Suitable polymers are water-soluble polymers such as polyacrylic acid, polymethacrylic acid, polymethacrylamide, polyvinylpyrrolidone, soluble amides, soluble carboxymethyl cellulose, hydroxymethyl cellulose, soluble polymers of maleic anhydride, soluble polymers of vinylether, polyvinylacetate and copolymers and mixtures thereof, as well as copolymers of (meth)acrylic acid and salts thereof. Suitable polymers are for instance described in U.S. Pat. No. 4,626,484, EP-A-0 545,458, DE-A-43 35 425 and EP-A-0092794. which are incorporated herein by reference. Preferred polymers are salts of styrene/acrylic acid copolymers, copolymers of vinylpyrrolidone and vinylacetate and salts of methyl methacrylate-methacrylate-acrylic acid terpolymers.

The polymers preferably have a weight average molecular weight in the range of about 1,000 to about 250,000, more preferably about 2,000 to about 20,000.

It is essential for the present invention that the solid content of the composition to be sprayed on is more than 10 wt % based on the total composition but no more than 50 wt %, preferably about 15 to about 35 wt %, more preferably about 18 to about 25 wt %. If the solid content is 10 wt % or less, the drying speed of the matting layer is not sufficient. If the solid content is higher than 50 wt %, the composition is not sprayable because: (1) of the high viscosity of the solution; or (2) the droplets dry before they reach the web to be matted, consequently do not adhere and make the surface appear dusty.

The weight average molecular weight and the polymer content preferably is controlled such that the viscosity of the matting composition is about 2 to about 20 mPa·s, more preferably about 5 to about 15 mPa·s.

The matting composition may optionally also contain at least one member selected from the group consisting of commonly used antifoaming agents like polysiloxanes and commonly used yellow dyes absorbing in the range of about 350 to 450 nm; the yellow dyes act as UV-absorbers. The antifoaming agents are used in an amount of 0 to about 0.5% by weight, while the yellow dyes are used in an amount of 0 to about 5% by weight based on the total composition.

For applying the matting composition, any commonly used electrostatically aided rotary atomizer can be used. Suitable atomizers are for instance disclosed in "Glasurit-Handbuch Lacke und Farben" (C. R. Vinconte Verlag) which is incorporated herein by reference. Useful atomizers are for instance commercially available from the companies De Vilbiss and ESB. The bell diameter is usually in the range of about 20 to 100 mm; most commonly used is a bell diameter of about 40 to 70 mm. The term "bell" as used herein refers to the electrostatic spray bell cup employed in electrostatically aided rotary atomizers, as disclosed, for example, in U.S. Pat. Nos. 6,003,784 and 6,003,785, and as will be readily understood by those skilled in the art.

For the process of the present invention it is essential that the distance between the bell (more precisely that part of the bell where the matting solution is released) and the surface to be spray-coated is less than 50 cm; preferably, the distance is about 10 to 40 cm, more preferably about 15 to 30 cm, most preferably about 15 to 20 cm. Commonly, it is preferred to have a relatively large distance, e.g. about 80 to 100 cm, to obtain a large atomizing cone. However, for the present invention the distance has to be less than 50 cm to avoid the situation where the produced droplets have already dried before they reach the surface of the web to be matted.

Furthermore, it is important that the rotation speed of the atomizer (bell speed) is more than 10,000 rpm, preferably in the range from about 15,000 to 60,000 rpm, more preferably in the range from about 25,000 to 40,000 rpm, most preferably about 30,000 rpm. By controlling the bell speed to be more than 10,000 rpm, it is possible to produce droplets having a diameter within a narrow range, for instance within the range of about 5 to 20 μm.

According to the process of the present invention it is possible to use two atomizers, i.e. two bells which simultaneously release the matting solution.

By controlling the bell to surface distance, the bell speed, and the solid content of the matting composition as described above, it is possible to produce a matting layer at a high web speed (also called line speed), for instance about 15 to about 100 m/min, preferably about 20 to about 60 m/min, more preferably about 30 to 40 m/min. Such a high web speed is possible since the matting layer dries immediately. Another advantage of the process according to the present invention is that no drying step (for instance in an oven or by air convection) is necessary, resulting in time and cost savings. The absence of a drying step also means that the web is not kept at an elevated temperature after the drying of the radiation-sensitive layer which is carried out before the matting step. To the contrary, it is preferred that the web is cooled down to a temperature of about 20 to 30° C. (for instance by use of a cooling roll) before spraying on the matting composition.

The electrostatic potential preferably lies in the range of about 5 to 100 kV, more preferably about 20 to 80 kV, most preferably about 20 to 40 kV.

Advantageously, to obtain an immediately dried matting layer by the present process, it is not necessary to work at elevated cabin temperature; a temperature of about 20° C. is sufficient. Furthermore, it is not necessary to reduce the cabin humidity. Immediate drying is also achieved at a humidity of about 50 to 70%.

The following examples are meant to describe the invention in more detail without limiting the invention in any way.

EXAMPLES

Example 1

An aqueous solution with a solids content of 20% and a viscosity of 11 mPa·s which contained the potassium salt JONCRYL 67™ (available from Johnson Polymers/

Netherlands) (an acrylic copolymer with an acid number of 215 mg KOH/g) was sprayed at a web speed of 40 m/min on a VIRAGE™ plate (a positive working plate precursor available from Kodak Polychrome Graphics) with the following process parameters: 2 electrostatic guns (bells); bell/web distance: 20 cm; web temperature: 30° C.; bell diameter: 56 mm; bell speed: 30,000 rpm; voltage: 30 kV; cabin temperature: 20° C.; cabin humidity: 60%.

Example 2

An aqueous solution with a solid content of 20% and a viscosity of 10 mPa·s containing a copolymer of vinylpyrrolidone and vinylacetate (PVP/VA w-735™ available from ISP/USA) was sprayed at a line speed of 40 m/min on a WINNER™ plate (a negative working plate precursor available from Kodak Polychrome Graphics) with the following process parameters: 2 electrostatic guns; gun/web distance: 20 cm; web temperature: 30° C.; bell diameter: 56 mm; bell speed: 30,000 rpm; voltage: 30 kV; cabin temperature: 20° C.; cabin humidity: 60%.

Result: The surface was not dusty and no deformation of the protuberances due to insufficient drying occurred when the web passed the face rollers.

Comparative Example 1

The solution from Example 1 was sprayed with one gun at a web distance of 50 cm, without changing the other parameters of Example 1. The obtained surface was very dusty which lead to build up of powder on subsequent face rollers.

Comparative Example 2

The solution from Example 2 was sprayed with a bell speed of 10,000 rpm, without changing the other parameters of Example 2. This resulted in larger droplets that were not sufficiently dry. As a consequence two production problems were observed: (1) leveling deformation reduced the height and thus the draw down performance; and (2) the larger droplets were sticking to the face roller, i.e. a drying step would have been required. Without drying, the droplets also stuck to the aluminum backside (when the web was rolled up) which also is known to deteriorate the draw down performance.

Although this invention has been illustrated by reference to specific embodiments, it will be apparent to those skilled in the art that various changes and modifications may be made which clearly fall within the scope of this invention.

We claim:

1. A method for applying a matting layer to a radiation-sensitive layer of a printing plate precursor comprising: (a) providing a matting composition comprising a polymer and a solvent, wherein the matting composition has a solid content of more than 10% and no more than 50% by weight based on the total composition; and (b) spraying the matting composition on the radiation-sensitive layer using an electrostatically aided rotary atomizer having a bell speed of more than 10,000 rpm, wherein the distance between the bell and the radiation-sensitive layer to be coated is less than 30 cm, and wherein following the spraying step the method does not comprise a dampening step, a drying step or a combination thereof.

2. The method according to claim 1, wherein the distance between the bell and the radiation-sensitive layer is about 10 to less than 30 cm.

3. The method according to claim 1, wherein the bell speed is about 15,000 to 60,000 rpm.

4. The method according to claim 1, wherein the solid content of the composition is about 15 to 35 wt %.

5. The method according to claim 1, wherein the printing plate precursor is in the form of a moving web.

6. The method according to claim 5, wherein the web speed is about 15 to 100 m/min.

7. The method according to claim 1, wherein the electrostatically aided rotary atomizer provides an electrostatic potential in the range of about 5 to 100 kV.

8. The method according to claim 1, wherein the solvent is water.

9. The method according to claim 1, wherein the polymer is selected from the group consisting of salts of acrylic acid copolymers and polyvinylpyrrolidonevinylacetate copolymers.

* * * * *